Dec. 22, 1964
T. R. BLANCHARD
3,162,049
SAMPLER FOR REACTION KETTLES AND OTHER
VESSELS UNDER PRESSURE OR VACUUM
Filed March 5, 1962
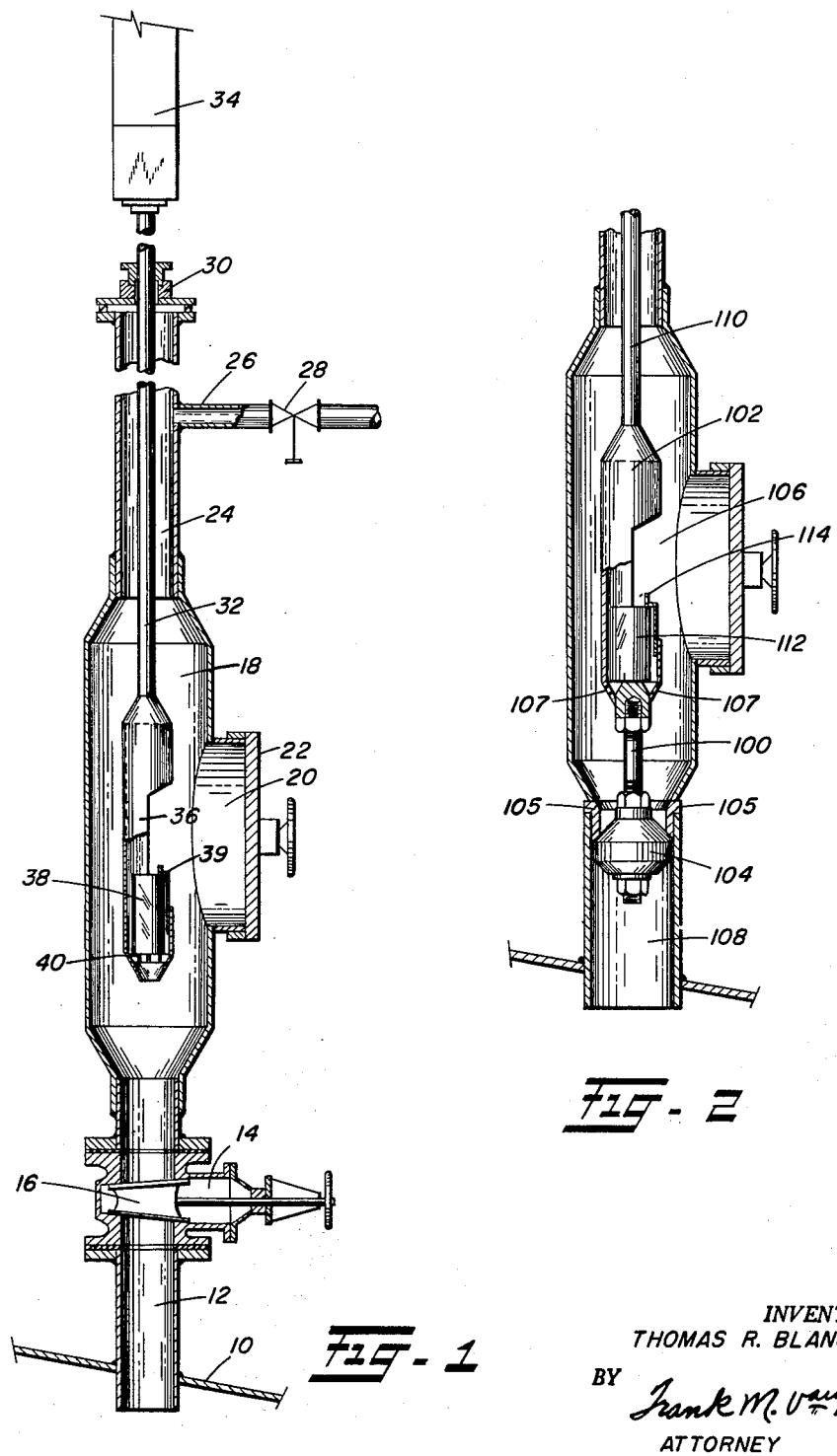
INVENTOR.
THOMAS R. BLANCHARD
BY
ATTORNEY

United States Patent Office 3,162,049
Patented Dec. 22, 1964

3,162,049
SAMPLER FOR REACTION KETTLES AND OTHER VESSELS UNDER PRESSURE OR VACUUM
Thomas R. Blanchard, Pittsburgh, Pa., assignor to American Cyanamid Company, New York, N.Y., a corporation of Maine
Filed Mar. 5, 1962, Ser. No. 177,578
2 Claims. (Cl. 73—421)

This invention relates to a novel sampling apparatus especially for use in vessels in which treatments are carried out under pressure or vacuum. More particularly, this invention relates to a novel sampling apparatus which enables the withdrawal of a substantial and representative sample of a material undergoing a pressure or vacuum reaction, from the interior of a closed vessel. Still more particularly, this invention relates to a sampling apparatus which enables the withdrawal of a sample of a material undergoing a pressure or vacuum treatment from the interior of a closed vessel without the necessity of first breaking the vacuum or reducing the pressure within the sealed vessel.

In many manufacturing processes, it is extremely desirable, if not essential, to be able, at any given time, to ascertain the condition of the material undergoing treatment in a closed vessel. This is particularly important in regard to processes involving a chemical or physical change of the material itself. Prior to my invention, the sampling of materials undergoing reaction was somewhat tedious and difficult particularly when the reaction was being conducted under pressure or vacuum conditions.

Prior to my invention, it generally was necessary to either adjust the pressure in the reaction kettle to atmospheric or break the vacuum therein before the reaction mass in the kettle could be sampled. However, according to my invention, a sample can now be removed from a sealed reaction kettle under pressure or vacuum without the necessity of first adjusting the pressure or breaking the vacuum. My apparatus enables such a sample to be obtained simply, quickly, and economically, with additional advantages relating to ease of operation, cleaning and maintaining of the sampling apparatus. Additionally, the cost of manufacture of the sampler is relatively low since the precise machining, internal small passages and close tolerances prevalent in commercially available samplers are obviated by my apparatus.

It is an object of the present invention to provide a novel sampling apparatus for use in reaction vessels in which treatments are carried out under pressure or vacuum.

It is a further object of the present invention to provide a novel sampling apparatus which enables the withdrawal of a substantial and representative sample of a material undergoing a pressure or vacuum treatment from the interior of a closed vessel.

It is a further object of the present invention to provide a sampling apparatus which enables the withdrawal of a sample of a material undergoing a pressure or vacuum reaction from the interior of a closed vessel without the necessity of first breaking the vacuum or reducing the pressure in the vessel to atmospheric.

This invention finds particular application in large vessels or kettles used for the production of resins, including polymers and copolymers, such as, for example, the polymerization of acrylamide, during which any change of temperature caused by loss of vacuum or pressure when extracting a sample might affect the quality of the product and increase the cycle time.

My invention comprises an apparatus, having as its essentials, a first tubular casing, preferably cylindrical, adapted so as to pass through an aperture in a wall of a reaction vessel above the liquid level thereof. The casing may be passed through any wall of the reaction vessel as long as it passes through it in a downwardly direction. However, it is generally preferable to use the top of the vessel as an entrance for the casing since the use of a side wall may present problems when actually sampling the contents of the vessel, especially when the liquid level of the reaction medium is above the aperture through which the sample is to be taken.

The apparatus additionally comprises: a chamber which preferably has a diameter somewhat larger than that of the casing attached to one end of said casing; an aperture in the chamber of sufficient size so as to allow the entrance or withdrawal of a sampling cup; a hinged door attached to said chamber and positioned so as to seal said opening when closed; a valve mechanism positioned in said first casing which functions so as to close off or open the chamber to the reaction vessel; a second tubular casing, also preferably cylindrical, fitted to the other end of said chamber; a vent attached to said second casing which functions so as to allow the exhaustion or entrance of atmosphere to the casings and chamber; a gas-tight housing attached to the open end of said second casing adapted so as to receive a rod member; a rod member fitted inside of the casings and positioned so as to centrally travel the length of the casings in a vertical direction; a container attached to the interior end of said rod having therein a sampling cup holding and securing means; and a raising and lowering means attached to the outer end of said rod.

In order that the invention may be more fully understood, reference is made to the accompanying drawings wherein preferred forms of the invention are illustrated and particularly described and wherein:

FIGURE 1 is a complete representation of the sampling apparatus and,

FIGURE 2 represents an alternative valve means for sealing the chamber from the reaction vessel.

Referring now to FIGURE 1 of the drawing, to the reaction vessel or kettle 10 is attached tubular casing 12. The casing may be permanently attached to the kettle, or the wall of the kettle may contain a sealable aperture into which the casing may be inserted or attached. Generally the casing is cylindrical and forms a part of the sampling apparatus, however, the sample may also be collected by removing casing 12 and utilizing, in lieu of the casing, a nozzle or other pipe-like fixture permanently affixed to the vessel, by attaching the sampler, at the lower end thereof, directly to the nozzle. Casing 12 should be of a minimum length so as to minimize the cost of other parts of the apparatus which must pass through the casing as set out hereinbelow.

Positioned in casing 12, is a valve 14. The valve is preferably of the Gate Valve variety and is fitted with adjustable member 16 which may be opened to allow passage of part of the apparatus through casing 12 and into vessel 10 or closed to seal the vessel from the sampler. This valve, when opened, and when the sampler is otherwise sealed from the atmosphere, performs the function of equalizing the pressure in kettle 10, casings 12 and 24, and chamber 18, and of allowing a sampling cup to be placed into and withdrawn from the contents of the reaction vessel without materially disturbing the vacuum or pressure condition in the vessel. Its use depends upon the fact that the volume of the kettle is many times greater than the volume of the casings and chamber of the sampler. Hence, the latter can be opened to the former without substantially affecting the pressure or vacuum conditions in the kettle. Any type of valve, which has a straight clear passage, such as a plug valve etc., may be used in place of the Gate Valve shown. A plug valve, however, has the disadvantage of occasionally sticking and, in addition, requires careful operation to make sure that the hole in the plug is aligned with casing 12 during the descent of a sampling cup.

Chamber 18 is attached to the end of casing 12 above valve 14. The chamber is preferably of a larger diameter than casing 12, but, alternatively, may be of a diameter equal to or smaller than that of the casing. The shape of the chamber is not critical, however, it is preferred that the bottom be tapered in order to allow the overflow and spillage of the sample taken to drain back freely into the kettle. The chamber may be permanently attached to casing 12, although it is somewhat more desirable to utilize a flange connection between the two for periodic removal and cleaning of the chamber.

Positioned in the cylindrical chamber, approximately at the center thereof, is aperture 20 which must be of sufficient size to allow the insertion of a sampling jar either by hand or with the aid of tongs. The aperture is securely sealed by hinged door 22 which must be airtight and generally possesses a clamping bar and pivot, not shown, to insure a completely tight fit.

Attached to the upper end of chamber 18, preferably by a flange connection, is second tubular casing 24. This casing is similar in shape to casing 12 and has positioned therein vent 26. Vent 26 is fitted with valve 28 and performs the function of allowing the exhaustion or entrance of atmosphere to the sampler after the latter has been sealed from the kettle by closing valve 14.

The upper end of casing 24 is fitted with gland housing 30. This housing is such that the vacuum or pressure conditions of the kettle and the sampler are maintained during the taking of a sample from the kettle. Although a gland housing is depicted in the drawing, any other housing or similar means may be used in lieu of the type shown, so long as it performs the function of maintaining the sampler air-tight at that point.

Passing through the housing 30, centrally positioned and running the length of casing 24, is rod 32. The rod is positioned in housing 30 such that it may move up or down with a moderate amount of effort and friction.

Rod 32 may be attached at its outer end to any known type of lowering and raising device 34. Any suitable device adapted so as to automatically raise and lower the sampler cup into the reaction mixture contained in the kettle may be used. Examples of these devices include a pneumatic cylinder, a rack and pinion, a pulley system, a lever system and the like. Although an automatic elevating device is preferred, it is also possible to operate rod 32 manually. A manual system, however, generally would be inconvenient and present a possible hazard since the top of the apparatus would not be easily accessible to an operator.

Attached to the interior end of rod 32 is container 36. This container is easily detachable from rod 32 by a threaded connection for removal and thorough cleaning at occasional intervals. The container is adapted to securely hold sampler cup 38 by a clamp or spring means 39, as shown. The sampler cup must be held securely in container 36 so as to prevent it from floating out of the container as it is immersed in the reaction medium. The container has an open bottom and is preferably fitted with a grate 40, as shown, upon which the sampler cup rests. This grate and open bottom allow any liquid which overflows from cup 38 to flow out of the container and back into the kettle. The container may be tapered at the top and bottom, as shown, for easy entry and return to and from vessel 10 through casing 12, i.e. the restricted valve passage shown at numeral 16.

The sampler cup and apparatus in general, may be constructed of any material which is non-reactive with the reaction medium. Generally, new sampler cups such as glass jars, molded plastic cups and the like may be used for each sampling since they are relatively inexpensive and generally cost less than cleaning the same container before each sample is taken.

Returning now to casing 24, the minimum length thereof is governed by the depth to which the sampler cup and holder must immerse into the reaction medium. This is critical since the volume of the batch in the reaction vessel changes during manufacture and the cup must always reach the minimum depth. Conversely, when the batch is at a maximum height, the cup and holder still submerge to the previous depth. In this instance, rod 32 will pick up the material undergoing treatment for a greater part of its length. Therefore, casing 24 must be of sufficient length so that when the wetted part of the rod is raised it does not reach housing 30, since if housing 30 comes in contact with the reaction material it becomes fouled.

Referring now to FIGURE 2, a rod 100 is attached by a threaded connection to the bottom of container 102. The rod has attached to the other end thereof a gasket type member 104 which may be constructed of any material which is unaffected by the reaction materials. Examples are polytetrafluoroethylene, rubber, impregnated asbestos, and similar resilient materials. Member 104, when the holder is raised to its uppermost position, is held securely against valve seat 105, thereby automatically forming an air-tight seal between the kettle and chamber 106. In this modification, container 102 is designed with a bottom portion having a plurality of holes 107 therein, as shown, so as to enable any material spilled from the cup to flow back into the reaction kettle. The valve seat is positioned at one end of casing 108 and extends around the inner periphery thereof. This automatic seal further simplifies the sampling operation and additionally prevents damage to the equipment should a valve type means in casing 108 be incorrectly manipulated. When this automatic self-sealing device is employed, any raising and lowering device attached to rod 110, as shown in FIGURE 1, must maintain an upward thrust such that member 104 is held firmly against the valve seat. If this is not the case, leakage will occur through the seal and cause a detrimental pressure and temperature variation in the kettle. Sampling cup 112 is securely held in container 102 by clamping means 114 in the same manner as indicated above in regard to FIGURE 1.

In operation, the sampling device may be used to sample liquids under pressure or vacuum in vessel 10 by first raising the container to the up position as shown in FIGURE 1. Gate valve 14 is then closed and valve 28 is opened. Door 22 is then opened and sampler cup 38 is fitted into container 36. The cup is securely fastened in container 36 by means of a clamping device, such as a spring mechanism 39. Door 22 and valve 28 are then closed and valve 14 is opened. This equalizes pressure or vacuum conditions in kettle 10, chamber 18 and casings 12 and 24. The container is then lowered into the kettle, below the liquid level therein, by raising and lowering means 34. When the sampler cup is full, the container is raised to aperture 20. The excess liquid is allowed to drain back into the kettle and valve 14 is then closed. Vent 26 is then opened by valve 28 to equalize the pressure in the apparatus to the atmosphere. Door 22 is then opened and the sample can be removed from cup 38 in order to ascertain to what degree the treatment of the reaction medium in vessel 10 has progressed.

The same procedure would be followed utilizing the mechanism shown in FIGURE 2 except that the function of opening and closing valve 14 would not be necessary.

By the term "under pressure" is mean that the treatment in the vessel is carried out at superatmospheric pressure while "under vacuum" signifies that the treatment is carried out at subatmospheric pressure.

I claim:

1. A sampling device adapted for extracting samples of material from a reaction vessel which comprises:
   (a) a casing,
   (b) a valve seat positioned at one end and extending around the inner periphery of said casing,
   (c) a chamber attached to the valve seat end of said casing and having a diameter larger than that of said casing,
(d) an aperture in said chamber,
(e) a cover attached to and positioned on said chamber so as to seal said aperture when closed,
(f) a second casing attached to said chamber at the end opposite said casing,
(g) a vent, fitted with a valve, positioned in said second casing,
(h) a gas-tight housing attached to the extreme end of said second casing,
(i) a rod passing through said housing, centrally positioned in and passing the entire length of said second casing,
(j) means attached to the outer end of said rod for lowering and raising said rod,
(k) an elongated cylindrical container attached to the inner end of said rod having positioned therein means for securing a cup, and
(l) a second rod member extending downwardly from the bottom of said container having attached thereto a member positioned such that when the cup holder is opposite said aperture, the member is fitted at all points against said valve seat, seating occuring when said container is moved in the upward direction.

2. A device for extracting a substantial and representative sample from the interior of a closed vessel which comprises:
(a) a first tubular casing,
(b) valve means positioned in said first casing,
(c) an elongated chamber, positioned lengthwise, attached to the end of said first casing above said valve means and having a diameter larger than that of said first casing and a tapered bottom portion adapted so as to cause liquid therein to drain therefrom,
(d) an aperture in the side of said chamber of sufficient size so as to allow the passage of a sampling cup therethrough,
(e) an air-tight door attached to said chamber and positioned so as to seal said aperture when closed,
(f) a second tubular casing attached to said chamber at the opposite end thereof from said first casing,
(g) a valve-containing vent attached to and positioned in said second casing,
(h) a gas-tight housing attached to the extreme outer end of said second casing and adapted so as to receive a rod member,
(i) a rod passing through said housing, centrally positioned in said second casing, and of sufficient length to vertically travel the entire length of the device,
(j) automatic means for lowering and raising said rod attached to the outer end thereof,
(k) an elongated, detachable container, positioned lengthwise, attached to the inner end of said rod and having a tapered top portion, tapered, open bottom portion and a diameter smaller than that of said first casing,
(l) a grate in the bottom portion of said container adapted so as to hold a sampling cup and allow liquid to flow therethrough, and,
(m) sampling cup clamping and securing means positioned in said container so as to securely retain a cup therein on said grate,
(n) said second casing being of sufficient length so as to allow rod (i) to raise container (k) to a position opposite aperture (d) without fouling housing (h) with material picked up on said rod while said container is in contact with material in the reaction vessel from which a sample is being taken.

References Cited in the file of this patent
UNITED STATES PATENTS
1,222,249    Tuttle _____ Apr. 10, 1917

FOREIGN PATENTS
185,004    Germany _____ Nov. 6, 1906